(12) United States Patent
Weder et al.

(10) Patent No.: US 6,393,801 B1
(45) Date of Patent: *May 28, 2002

(54) METHOD OF WRAPPING A FLOWER POT

(75) Inventors: Donald E. Weder; Joseph G. Straeter, both of Highland; William F. Straeter, Breese, all of IL (US)

(73) Assignee: Southpac Trust Int'l. Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/717,785

(22) Filed: Nov. 21, 2000

Related U.S. Application Data

(63) Continuation of application No. 09/185,763, filed on Nov. 3, 1998, now Pat. No. 6,185,903, which is a continuation of application No. 08/764,479, filed on Dec. 12, 1996, now Pat. No. 5,829,225, which is a continuation-in-part of application No. 08/608,390, filed on Feb. 28, 1996, now Pat. No. 5,628,146, which is a continuation of application No. 08/457,186, filed on Jun. 1, 1995, now Pat. No. 5,572,849, which is a continuation of application No. 08/386,859, filed on Feb. 10, 1995, now Pat. No. 5,493,809, which is a continuation-in-part of application No. 08/237,078, filed on May 3, 1994, now Pat. No. 5,625,979, which is a continuation-in-part of application No. 08/220,852, filed on Mar. 31, 1994, now Pat. No. 5,572,851, which is a continuation-in-part of application No. 08/001,001, filed on Jan. 6, 1993, now Pat. No. 5,307,606.

(51) Int. Cl.[7] .......................... B65B 25/02; B65B 51/00
(52) U.S. Cl. ........................ 53/397; 53/416; 53/459
(58) Field of Search .................... 53/397, 416, 419, 53/459, 464, 592, 218, 219, 390; 47/72; 206/423; 383/120

(56) References Cited

U.S. PATENT DOCUMENTS

| 524,219 A | 8/1894 | Schmidt |
|---|---|---|
| 732,889 A | 7/1903 | Paver |
| 950,785 A | 3/1910 | Pene |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |

(List continued on next page.)

FOREIGN PATENT DOCUMENTS

| AU | 4231978 | 6/1979 |
|---|---|---|
| BE | 654427 | 1/1965 |
| CH | 560532 | 4/1975 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

(List continued on next page.)

*Primary Examiner*—Stephen F. Gerrity
(74) *Attorney, Agent, or Firm*—Dunlap, Codding & Rogers

(57) ABSTRACT

A sleeve used to wrap items such as potted plants. The sleeve may have an open or closed bottom. When closed, the bottom may have a gusset for allowing expansion upon the depositing of the pot into the sleeve. The sleeve has a detachable upper portion. The sleeve has a bonding material disposed upon an inner and/or outer portion of the sleeve for crimping the sleeve adjacent the pot to hold the sleeve about the pot.

18 Claims, 9 Drawing Sheets

U.S. PATENT DOCUMENTS

| | | |
|---|---|---|
| 1,697,751 A | 1/1929 | Blake |
| 1,863,216 A | 6/1932 | Wordingham |
| 1,978,631 A | 10/1934 | Herrlinger |
| 2,048,123 A | 7/1936 | Howard |
| RE21,065 E | 5/1939 | Copeman |
| 2,170,147 A | 8/1939 | Lane |
| 2,200,111 A | 5/1940 | Bensel |
| 2,278,673 A | 4/1942 | Savada et al. |
| 2,302,259 A | 11/1942 | Rothfuss |
| 2,323,287 A | 7/1943 | Amberg |
| 2,355,559 A | 8/1944 | Renner |
| 2,371,985 A | 3/1945 | Freiberg |
| 2,411,328 A | 11/1946 | MacNab |
| 2,510,120 A | 6/1950 | Leander |
| 2,529,060 A | 11/1950 | Trillich |
| 2,621,142 A | 12/1952 | Wetherell |
| 2,648,487 A | 8/1953 | Linda |
| 2,688,354 A | 9/1954 | Berger |
| 2,774,187 A | 12/1956 | Smithers |
| 2,822,287 A | 2/1958 | Avery |
| 2,846,060 A | 8/1958 | Yount |
| 2,850,842 A | 9/1958 | Eubank, Jr. |
| 2,883,262 A | 4/1959 | Borin |
| 2,989,828 A | 6/1961 | Warp |
| 3,022,605 A | 2/1962 | Reynolds |
| 3,080,680 A | 3/1963 | Reynolds |
| 3,094,810 A | 6/1963 | Kalpin |
| 3,121,647 A | 2/1964 | Harris et al. |
| 3,130,113 A | 4/1964 | Silman |
| 3,271,922 A | 9/1966 | Wallerstein et al. |
| 3,322,325 A | 5/1967 | Bush |
| 3,376,666 A | 4/1968 | Leonard |
| 3,380,646 A | 4/1968 | Doyen et al. |
| 3,431,706 A | 3/1969 | Stuck |
| 3,508,372 A | 4/1970 | Wallerstein et al. |
| 3,510,054 A | 5/1970 | Sanni et al. |
| 3,512,700 A | 5/1970 | Evans et al. |
| 3,552,059 A | 1/1971 | Moore |
| 3,554,434 A | 1/1971 | Anderson |
| 3,556,389 A | 1/1971 | Gregoire |
| 3,557,516 A | 1/1971 | Brandt |
| 3,620,366 A | 11/1971 | Parkinson |
| 3,681,105 A | 8/1972 | Milutin |
| 3,767,104 A | 10/1973 | Bachman et al. |
| 3,793,799 A | 2/1974 | Howe |
| 3,869,828 A | 3/1975 | Matsumoto |
| 3,888,443 A | 6/1975 | Flanigen |
| 3,962,503 A | 6/1976 | Crawford |
| 4,043,077 A | 8/1977 | Stonehocker |
| 4,054,697 A | 10/1977 | Reed et al. |
| 4,091,925 A | 5/1978 | Griffo et al. |
| 4,113,100 A | 9/1978 | Soja et al. |
| 4,118,890 A | 10/1978 | Shore |
| 4,189,868 A | 2/1980 | Tymchuck et al. |
| 4,216,620 A | 8/1980 | Weder et al. |
| 4,248,347 A | 2/1981 | Trimbee |
| D259,333 S | 5/1981 | Charbonneau |
| 4,265,049 A | 5/1981 | Gorewitz |
| 4,280,314 A | 7/1981 | Stuck |
| 4,297,811 A | 11/1981 | Weder |
| 4,333,267 A | 6/1982 | Witte |
| 4,347,686 A | 9/1982 | Wood |
| 4,380,564 A | 4/1983 | Cancio et al. |
| 4,400,910 A | 8/1983 | Koudstall et al. |
| 4,413,725 A | 11/1983 | Bruno et al. |
| D279,279 S | 6/1985 | Wagner |
| 4,546,875 A | 10/1985 | Zweber |
| 4,621,733 A | 11/1986 | Harris |
| 4,640,078 A | 2/1987 | Stuck |
| 4,717,262 A | 1/1988 | Roen et al. |
| 4,733,521 A | 3/1988 | Weder et al. |
| 4,765,464 A | 8/1988 | Ristvedt |
| 4,771,573 A | 9/1988 | Stengel |
| 4,773,182 A | 9/1988 | Weder et al. |
| 4,801,014 A | 1/1989 | Meadows |
| 4,810,109 A | 3/1989 | Castel |
| 4,835,834 A | 6/1989 | Weder |
| D301,991 S | 7/1989 | Van Sant |
| 4,941,572 A | 7/1990 | Harris |
| 4,980,209 A | 12/1990 | Hill |
| 5,073,161 A | 12/1991 | Weder et al. |
| 5,074,675 A | 12/1991 | Osgood |
| 5,105,599 A | 4/1992 | Weder |
| 5,111,638 A | 5/1992 | Weder |
| 5,120,382 A | 6/1992 | Weder |
| 5,152,100 A | 10/1992 | Weder et al. |
| 5,181,364 A | 1/1993 | Weder |
| D335,105 S | 4/1993 | Ottenwalder et al. |
| 5,199,242 A | 4/1993 | Weder et al. |
| 5,205,108 A | 4/1993 | Weder et al. |
| 5,228,234 A | 7/1993 | de Klerk et al. |
| 5,235,782 A | 8/1993 | Landau |
| 5,239,775 A | 8/1993 | Landau |
| 5,249,407 A | 10/1993 | Stuck |
| 5,259,106 A | 11/1993 | Weder et al. |
| 5,307,606 A | 5/1994 | Weder |
| 5,315,785 A | 5/1994 | Avôt et al. |
| 5,350,240 A | 9/1994 | Billman et al. |
| 5,353,575 A | 10/1994 | Stepanek |
| 5,361,482 A | 11/1994 | Weder et al. |
| 5,388,695 A | 2/1995 | Gilbert |
| 5,400,905 A * | 3/1995 | Lapalud et al. ............. 206/423 |
| 5,428,939 A | 7/1995 | Weder et al. |
| 5,443,670 A | 8/1995 | Landau |
| 5,493,809 A | 2/1996 | Weder et al. |
| D368,025 S | 3/1996 | Sekerak et al. |
| 5,496,251 A | 3/1996 | Cheng |
| 5,496,252 A | 3/1996 | Gilbert |
| 5,526,932 A | 6/1996 | Weder |
| 5,572,849 A | 11/1996 | Weder et al. |
| 5,572,851 A | 11/1996 | Weder |
| 5,575,133 A | 11/1996 | Weder et al. |
| 5,617,703 A | 4/1997 | Weder |
| 5,624,320 A | 4/1997 | Martinez |
| 5,647,168 A | 7/1997 | Gilbert |
| 5,829,225 A | 11/1998 | Weder et al. |
| 6,185,903 B1 * | 2/2001 | Weder et al. .................. 53/397 |

FOREIGN PATENT DOCUMENTS

| | | |
|---|---|---|
| DE | 2748626 | 5/1979 |
| DE | 3829281 | 5/1989 |
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |
| FR | 21373250 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| GB | 5605 | 5/1885 |
| GB | 1204647 | 9/1970 |
| GB | 0256410 | 3/1981 |
| GB | 2074542 | 11/1981 |
| GB | 2252708 | 8/1982 |
| GB | 2128083 | 4/1984 |
| IT | 224507 | 4/1996 |
| JP | 542958 | 2/1993 |
| NL | 8301709 | 12/1984 |

| | | |
|---|---|---|
| NL | 1000658 | 1/1996 |
| WO | 9315979 | 8/1993 |

OTHER PUBLICATIONS

"Super Seller", Supermarket Floral, Sep. 15, 1992.
"Halloween", Link Magazine, Sep. 1992, 2 pages.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.

"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

* cited by examiner

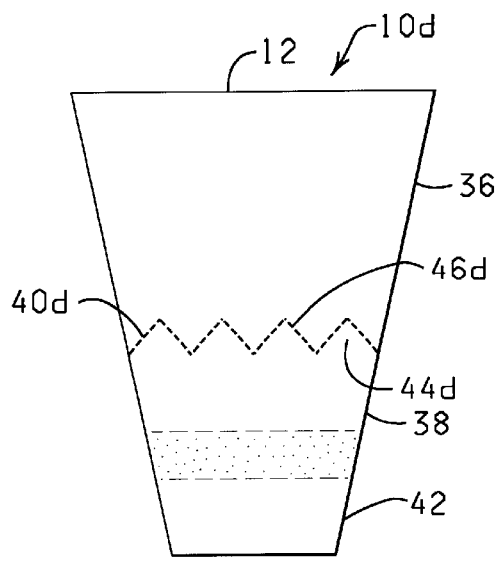
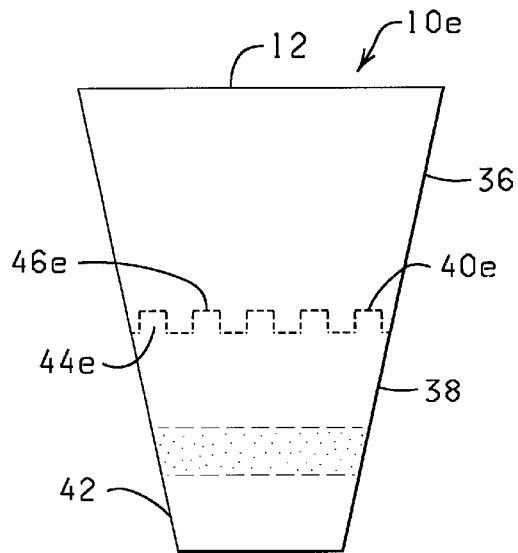
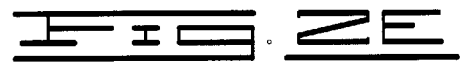
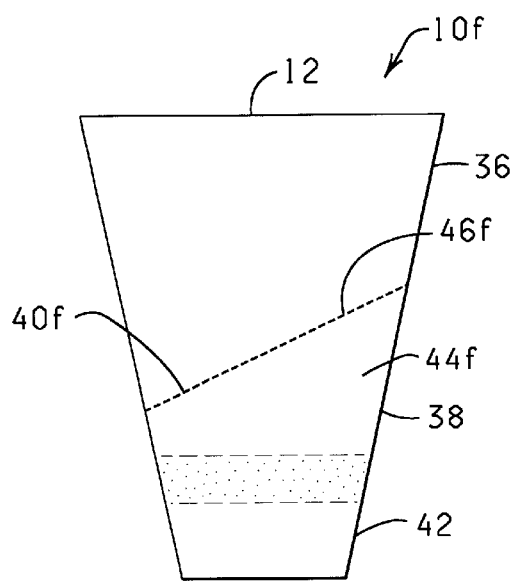
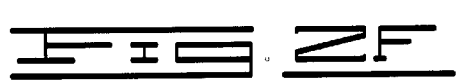
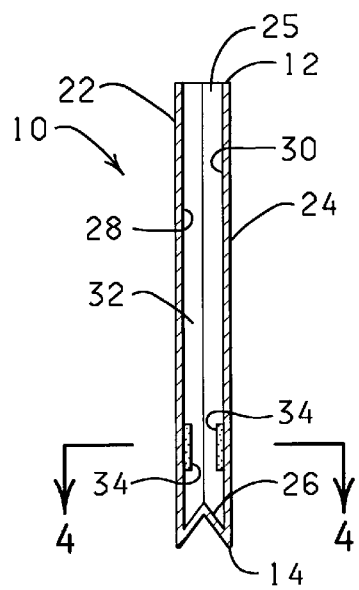

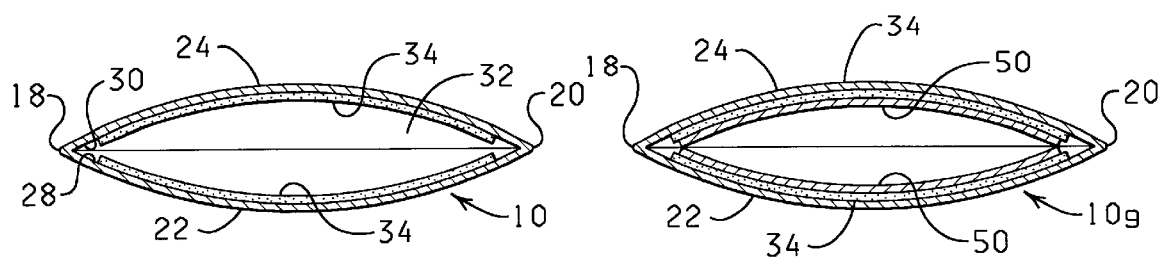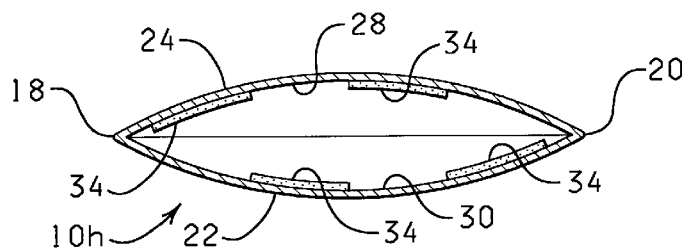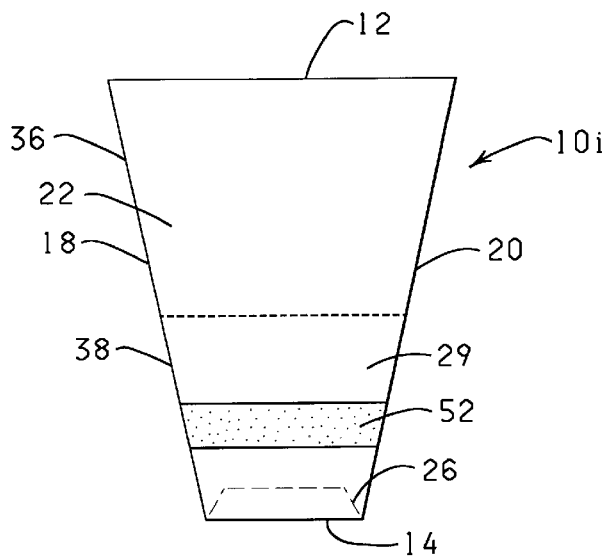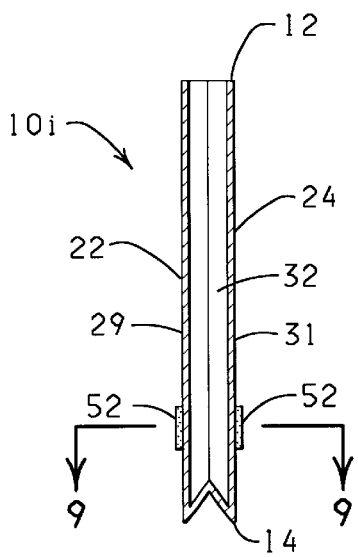

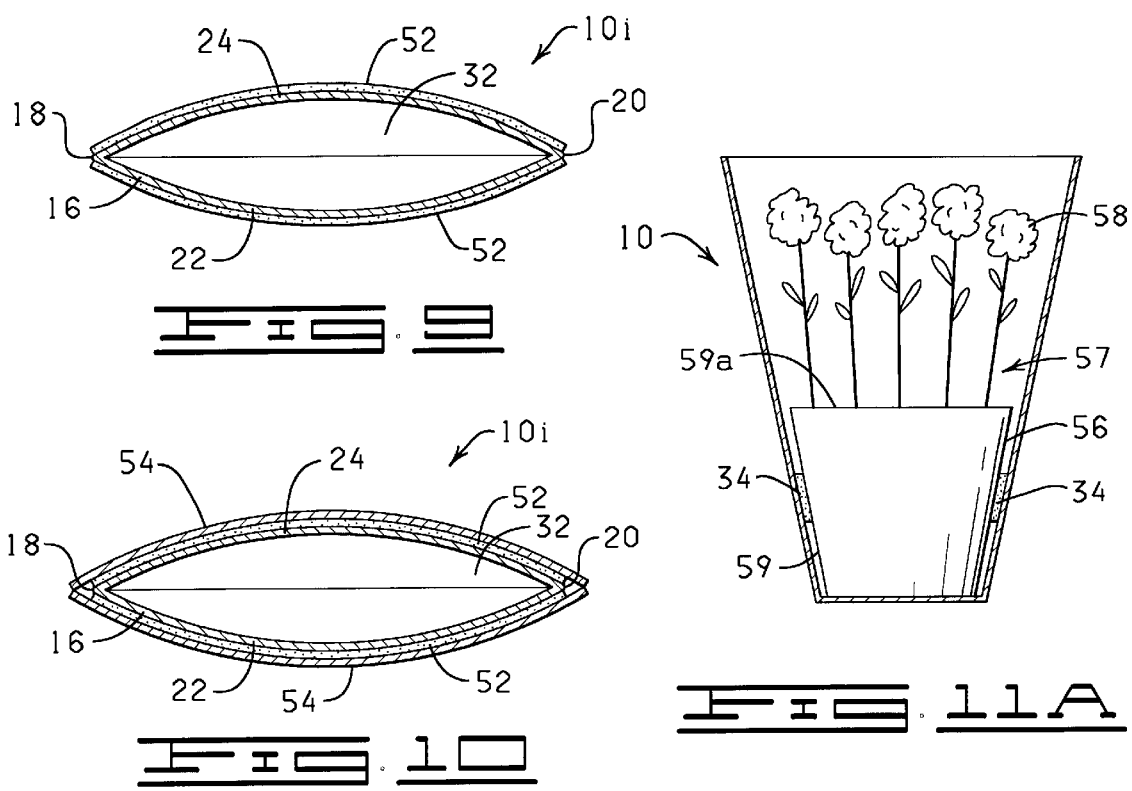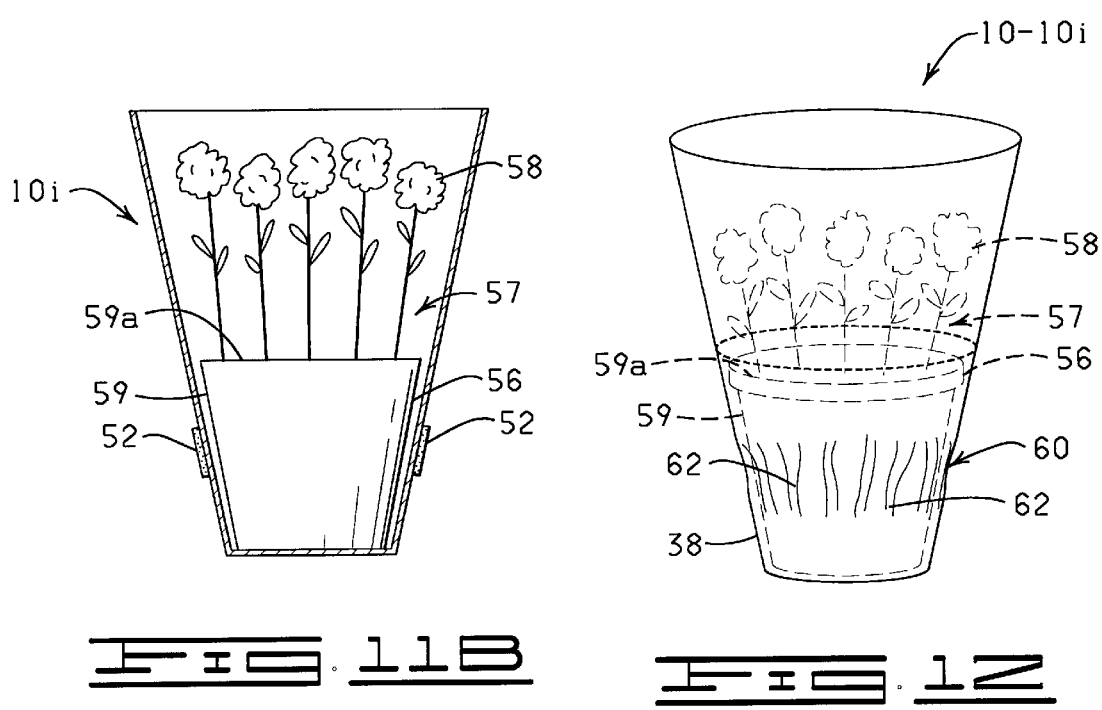

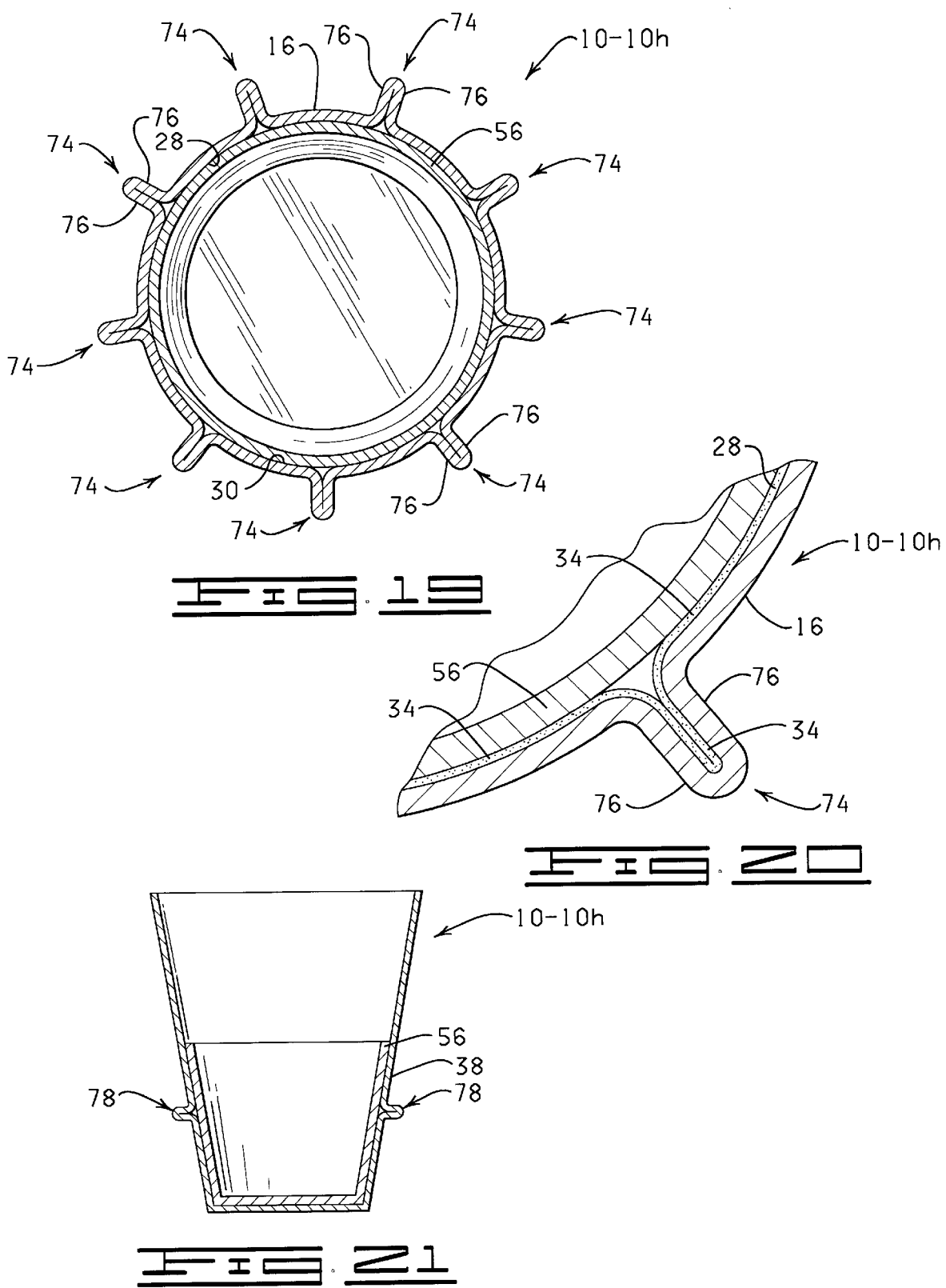

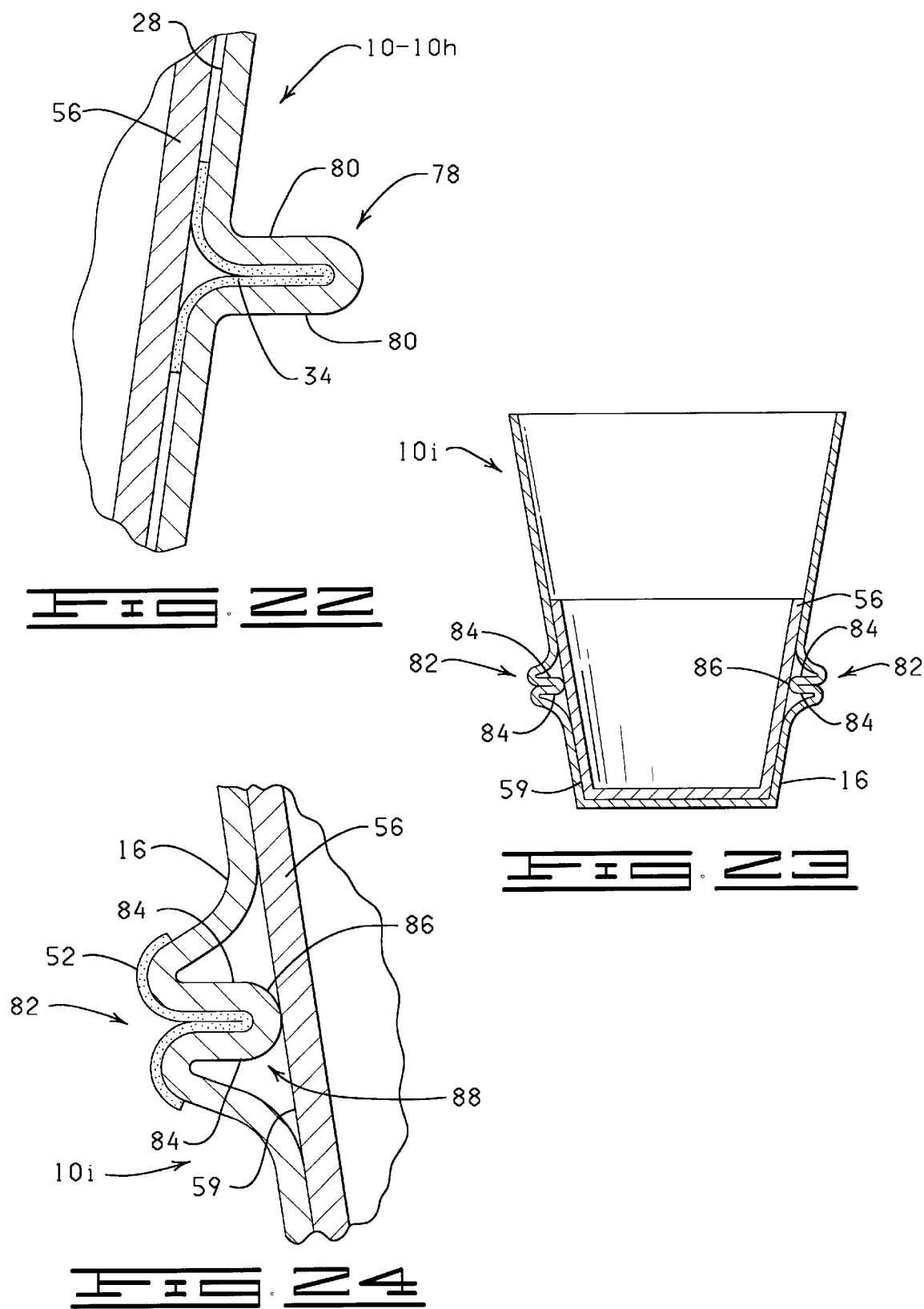

METHOD OF WRAPPING A FLOWER POT

CROSS REFERENCE TO RELATED APPLICATIONS

The present application is a continuation of U.S. Ser. No. 09/185,763, filed Nov. 3, 1998, now U.S. Pat. No. 6,185,903 which is a continuation of U.S. Ser. No. 08/764,479, filed Dec. 12, 1996, now U.S. Pat. No. 5,829,225, which is a continuation-in-part of U.S. Ser. No. 08/608,390, filed Feb. 28, 1996, now U.S. Pat. No. 5,628,146, which is a continuation of U.S. Ser. No. 08/457,186, filed Jun. 1, 1995, entitled "SLEEVE HAVING A DETACHABLE PORTION FOR FORMING A POT COVER", now U.S. Pat. No. 5,572,849, which is a continuation of U.S. Ser. No. 08/386,859, filed Feb. 10, 1995, entitled "SLEEVE HAVING A DETACHABLE PORTION FOR FORMING A POT COVER", now U.S. Pat. No. 5,493,809, issued Feb. 27, 1996, which is a continuation-in-part of U.S. Ser. No. 08/237,078, filed May 3, 1994, entitled "SLEEVE HAVING A DETACHABLE PORTION FOR FORMING A SKIRT AND METHODS", now U.S. Pat. No. 5,625,979, which is a continuation-in-part of U.S. Ser. No. 08/220,852, filed Mar. 31, 1994, now U.S. Pat. No. 5,572,851, which is a continuation-in-part of U.S. Ser. No. 08/001,001, filed Jan. 6, 1993, now U.S. Pat. No. 5,307,606.

Each of these patent applications and patents is hereby incorporated herein by reference in its entirety.

STATEMENT REGARDING FEDERALLY SPONSORED RESEARCH OR DEVELOPMENT

Not Applicable

BACKGROUND OF INVENTION

This invention generally relates to sleeves, and more particularly, to sleeves used to wrap flower pots containing floral groupings and/or mediums containing floral groupings, and methods of using same.

BRIEF DESCRIPTION OF THE DRAWINGS

FIG. 2D is an elevational view of a version of a sleeve wherein the perforations have a zig-zag pattern.

FIG. 2E is an elevational view of a version of a sleeve wherein the perforations have a rectangular pattern.

FIG. 2F is an elevational view of a version of a sleeve wherein the perforations are diagonally slanted.

FIG. 3 is a cross-sectional view of a sleeve constructed in accordance with the present invention.

FIG. 4 is a cross-sectional view of the version of the sleeve of FIG. 3 taken along line 4—4 thereof.

FIG. 5 is a cross-sectional view of the sleeve with a release material disposed on a bonding material.

FIG. 6 is a cross-sectional view of a version of a sleeve having staggered areas of bonding material on inner surfaces thereof.

FIG. 7 is an elevational view of an alternate version of the sleeve of the present invention wherein areas of bonding material are disposed upon portions of an outer surface of the sleeve.

FIG. 8 is a cross-sectional view of the sleeve of FIG. 7 having a bonding material disposed on both sides of the sleeve.

FIG. 9 is a cross-sectional view of the sleeve of FIG. 8 taken along line 9—9 thereof.

FIG. 10 is a cross-sectional view of an alternate version of the sleeve of FIG. 8 wherein release material is disposed upon the areas of bonding material.

FIG. 11A is an elevational view, partially in cross-section, of a potted plant disposed within a sleeve such as the sleeve shown in FIG. 3.

FIG. 11B is an elevational view, partially in cross-section, of a potted plant disposed within a sleeve such as the sleeve shown in FIG. 8.

FIG. 12 is a perspective view of a potted plant having a sleeve crimped thereabout.

FIG. 19 is a cross-sectional view of a sleeve crimped about a pot in yet another style.

FIG. 20 is an enlarged, fragmental cross-sectional view of one of the crimped folds shown in FIG. 19 where bonding material is disposed on an inner surface of the sleeve such as with the sleeve in FIG. 3.

FIG. 21 is a cross-sectional view of a sleeve crimped about a pot in yet another style in accordance with the present invention.

FIG. 22 is an enlarged, fragmental cross-sectional view of one of the crimped folds shown in FIG. 21 where bonding material is disposed on an inner surface of the sleeve such as with the sleeve of FIG. 3.

FIG. 23 is a cross-sectional view of a sleeve crimped about a pot i still another style in accordance with the present invention.

FIG. 24 is an enlarged, fragmental cross-sectional view of one of the crimped folds shown in FIG. 23 where bonding material is disposed on an outer surface of the sleeve such as with the sleeve of FIG. 8.

DESCRIPTION OF THE PREFERRED EMBODIMENTS

Figure 1:
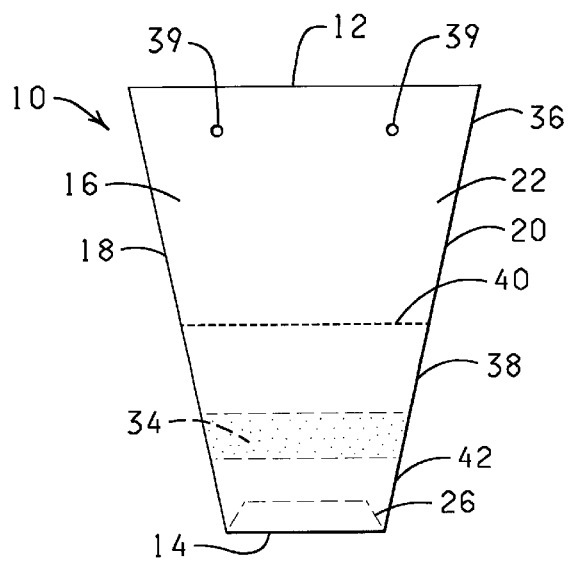
FIG. 1 is an elevational view of a sleeve having a detaching element and bonding material constructed in accordance with the present invention.

The present invention contemplates a plant packaging system comprising a sleeve having a combination of an upper portion which is protective and a lower portion which is decorative and has a base portion and optionally a skirt portion for packaging a potted plant. The upper portion can be detached from the decorative lower portion of the package system once the function of the upper portion has been completed, thereby exposing the decorative cover and allowing the skirt portion, if present, to extend outwardly from the base portion. The upper portion and lower portion components may comprise a unitary construction or may comprise separate components which are attached together by various bonding materials. The sleeve also has a bonding material thereon for forming a crimped portion which holds the sleeve about a pot without bonding the sleeve to the pot.

The upper portion may be detachable via a detaching element such as perforations, tear strips and zippers. The sleeve may have an extended portion extending from the upper portion for serving as a handle or support device.

A preferred version of the invention is a flexible sleeve which comprises a flattened body having a closed or open lower end, an open upper end, an outer peripheral surface, and an inner peripheral surface surrounding an inner retaining space. The sleeve further comprises, as noted above and discussed in further detail below, a lower portion having an inner retaining space for enclosing the pot and an upper portion connected to the lower portion and sized to substantially surround and encompass the floral grouping when the pot and floral grouping are disposed within the sleeve, wherein the upper portion is detachable from the lower portion via a detaching element such as perforations positioned in a predetermined pattern. A bonding material is disposed upon a portion of the inner peripheral surface, the outer peripheral surface or both surfaces. The bonding material is for bondingly connecting folded portions of the sleeve when the sleeve is opened and the pot is disposed within the inner retaining space which thereby hold the lower portion of the sleeve in a position about the pot and the upper portion of the sleeve in a position about the floral grouping.

The sleeve may further comprise a release material for preventing the bonding material from bondingly connecting to an opposing portion of the sleeve or to a surface thereof. A closure bonding material may be disposed upon the upper portion near the upper end for sealing the upper end of the sleeve for enclosing the floral grouping within the upper portion. The upper portion may further comprise apertures for enabling ventilation of the enclosed floral grouping.

The flattened body may be further defined as having a first side which has a first edge, a second edge, an upper edge, a lower edge, an outer surface and an inner surface, a second side which has a first edge, a second edge, an upper edge, a lower edge, an outer surface and an inner surface, and wherein in a flattened condition of the sleeve, the inner surface of the first side rests flatwise upon the inner surface of the second side and the first edge of the first side is sealed to the first edge of the second side and the second edge of the first side is sealed to the second edge of the second side.

Further detail and explanation of the articles and methods of the present invention are forthcoming in the description provided below.

Embodiments of FIGS. 1–12

Shown in FIGS. 1, 3 and 4 and designated therein by the general reference numeral 10 is a flexible bag or sleeve of unitary construction. The sleeve 10 initially comprises a flexible flattened piece of material which is openable into the form of a tube or sleeve. The sleeve 10 is preferably tapered outwardly from the lower end toward a larger diameter. at its upper end as shown in FIG. 1, or may be cylindrical. In its flattened state the sleeve 10 may have an overall trapezoidal, modified trapezoidal or contoured (non-linear) shape, and when opened is generally substantially frusto-conical to conform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a sealed first edge 18 and a sealed second edge 20 and a first side 22 and a second side 24. The sleeve 10 has an opening 25 at the upper end 12 and in one version of the invention has a closed bottom at the lower end 14. Preferably the lower end 14 when closed has a gusset 26 but it may simply be sealed along an edge. The first side 22 has a first inner peripheral surface 28 and the second side 24 has a second inner peripheral surface 30 which together, when the sleeve 10 is opened, define and encompass an inner retaining space 32 as shown in FIGS. 3 and 4. When the lower end 14 of the sleeve 10 has a closed bottom, a portion of the lower end 14 may be inwardly folded to form one or more gussets 26, as noted above, for permitting a circular bottom of an object such as a pot 56 to be disposed into the inner retaining space 32 and on the lower end 14 of the sleeve 10. When present, the gusset 26 may be a standard straight gusset forming a straight bottom edge on the sleeve 10 or the gusset 26 may have a rounded portion such as is shown and described in U.S. Ser. No. 09/401,771, the specification and drawings of which are hereby incorporated herein in their entirety.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve 10 may comprise any shape, whether geometric, non-geometric, asymmetrical and/or fanciful as long as it functions in accordance with the present invention. In a preferred embodiment the sleeve 10 is oversized. Where used herein the term "oversized" means that the portion of the sleeve 10 adjacent the pot 56 comprises an excess amount of material sufficient for forming the crimped portion. The sleeve 10 may also be equipped with drains or ventilation holes (not shown), or can be made from permeable or impermeable materials.

The material from which the sleeve 10 is constructed preferably has a thickness in a range from about 0.1 mil to about 30 mils, although in some cases the sleeve 10 may be much thicker, especially when the sleeve 10 is constructed from multiple layers. Often, the thickness of the sleeve 10 is in a range from about 0.5 mil to about 10 mils. Preferably, the sleeve 10 has a thickness in a range from about 1.0 mil to about 5 mils. More preferably, the sleeve 10 is constructed from material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot 56 or potted plant 57 or a floral grouping 58, as described herein. Additionally, an insulating material such as bubble film, preferable as one of two or more layers, can be utilized in order to provide additional protection for the item, such as the floral grouping 58, contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot 56. This connecting engagement is preferably temporary in that the material may be easily removed, i.e., the cling material "clings" to the pot 56.

The cling material is constructed and treated if necessary, from polyethylene such as Cling Wrap made by Glad®, First Brands Corporation, Danbury, Conn. The thickness of the cling material will, in part, depend upon the size of sleeve 10 and the size of the pot 56 in the sleeve 10, i.e., generally, a larger pot 56 may require a thicker and therefore stronger cling material. The cling material will range in thickness from less than about 0.1 mil to about 10 mils, and preferably less than about 0.5 mil to about 2.5 mils and most preferably from less than about 0.6 mil to about 2 mils. However, any thickness of cling material may be utilized in accordance with the present invention which permits the cling material to function as described herein.

The sleeve 10 is constructed from any suitable material that is capable of being formed into a sleeve and wrapped about a pot 56 and a floral grouping 58 disposed therein. Preferably, the material comprises paper (untreated or treated in any manner), metal foil, polymeric film, non-polymeric film, fabric (woven or nonwoven or synthetic or natural), cardboard, fiber, cloth, burlap, or laminations or combinations thereof.

The term "polymeric film" means a man-made polymer such as a polypropylene or a naturally occurring polymer such as cellophane. A polymeric film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various coloring, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

It will generally be desired to use the sleeve 10 as a covering for a potted plant 57 such as is well known in the art. The term "pot 56" as used herein refers to any type of container used for holding a floral grouping or plant. Examples of pots 56, used in accordance with the present invention include, but not by way of limitation, clay pots, wooden pots, plastic pots, pots made from natural and/or synthetic fibers, or any combination thereof. The pot 56 is adapted to receive a floral grouping 58 in the retaining space. The floral grouping 58 may be disposed within the pot 56 along with a suitable growing medium described in further detail below, or other retaining medium, such as a floral foam. It will also be understood that the floral grouping 58, and any appropriate growing medium or other retaining medium, may be disposed in the sleeve 10 without a pot 56.

The term "floral grouping 58" as used herein means cut fresh flowers, artificial flowers, a single flower or other fresh and/or artificial plants or other floral materials and may include other secondary plants and/or ornamentation or artificial or natural materials which add to the aesthetics of the overall floral grouping 58. The floral grouping 58 comprises a bloom or foliage portion and a stem portion. Further, the floral grouping 58 may comprise a growing potted plant 57 having a root portion (not shown) as well. However, it will be appreciated that the floral grouping 58 may consist of only a single bloom or only foliage, or a botanical item (not shown), or a propagule (not shown). The term "floral grouping 58" may be used interchangeably herein with both the terms "floral arrangement" and "potted plant". The term "floral grouping 58" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping 58.

The term "propagule" when used herein means any structure capable of being propagated or acting as an agent of reproduction including seeds, shoots, stems, runners, tubers, plants, leaves, roots or spores.

In accordance with the present invention, a bonding material 34 is disposed on a portion of the sleeve 10 to assist in holding the sleeve 10 about the pot 56 having the floral grouping 58 therein when such a pot 56 is disposed within the sleeve 10. An additional bonding material (not shown) may be disposed upon a portion of the sleeve 10 to assist in closing the upper end 12 of the sleeve 10 after the pot 56 has been disposed therein, as will be discussed in further detail below.

It will be understood that the bonding material 34 may be disposed as a strip or block on a surface of the sleeve 10 as is described in more detail herein. The bonding material 34 may also be disposed upon either the first side 22, the second side 24, the first inner peripheral surface 28, or the second inner peripheral surface 30, of the sleeve 10. Further, the bonding material 34 may be disposed as spots of bonding material, or in any other geometric, non-geometric, asymmetric, or fanciful form and in any pattern including covering either the entire first and second inner peripheral surfaces 28 and 30 and/or outer peripheral surface 16 of the sleeve 10 and/or the pot 56.

The bonding material 34 may be covered by a cover material or release strip which can be removed prior to the use of the sleeve 10, or pot 56. The bonding material 34 can be applied by methods known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material" when used herein means an adhesive, frequently a pressure sensitive adhesive, or a cohesive which bonds only to a surface having another such cohesive thereon. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material 34. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the desired shape is reduced. A cold seal adhesive binds quickly and easily with minimal pressure, and such a seal is not readily releasable. This characteristic is different from, for example, a pressure sensitive adhesive.

Certain versions of the sleeve 10 described herein may be used in conjunction with a preformed plant cover as explained in greater detail below.

As shown in FIG. 1, in a preferred version of the invention, the sleeve 10 is demarcated into an upper portion 36 and a lower portion 38. As noted above, the lower portion 38 of the sleeve 10 is oversized, that is it is generally sized to be at least slightly larger than the size of the pot 56 to be placed within the lower portion 38 to enable the lower portion 38 to be crimped about an outer peripheral surface 59 of the pot 56. The lower portion 38 may have a height equal to or greater than the height of the pot 56 disposed within the sleeve 10. The upper portion 36 may optionally have apertures 39 near the upper end 12 thereof for allowing the sleeve 10 to be supported by a support mechanism such as a pair of wickets (not shown) such as is known in the art. The upper portion 36 of the sleeve 10 is generally sized to substantially surround and encompass the floral grouping 58 of the potted plant 57 disposed within the lower portion 38 of the sleeve 10. The sleeve 10 is demarcated into the upper portion 36 and the lower portion 38 by a detaching element 40 for enabling the detachment of the upper portion 36 of the sleeve 10 from the lower portion 38 of the sleeve 10. In another version of the present invention, the sleeve 10 may be comprised only of a "lower portion 38" which generally encompasses only the pot 56 and may extend about a lower portion of the floral grouping 58, i.e., there is no upper portion 36 for substantially surrounding and encompassing the floral grouping. In the version shown in FIG. 1, the detaching element 40 is a plurality of perforations which extend across the outer peripheral surface 16 of the sleeve 10 from the first edge 18 to the second edge 20.

The term "detaching element" as used generally herein, means any element, or combination of elements; or features, such as, but not limited to, perforations, tear strips, tear starts, zippers, and any other devices or elements of this nature known in the art, or any combination thereof, which enable or facilitate the tearing away or detachment of one object from another. Therefore, while perforations are shown and described in detail herein, it will be understood that tear strips, zippers, or any other "detaching elements" known in the art, or any combinations thereof, could be substituted therefor and/or used therewith. The sleeve 10 may comprise drainage or ventilation holes in the upper or lower portions 36 or 38, respectively, for allowing movement of gases or moisture to and away from the inner retaining space 32 of the sleeve 10 (not shown).

Figure 2A:
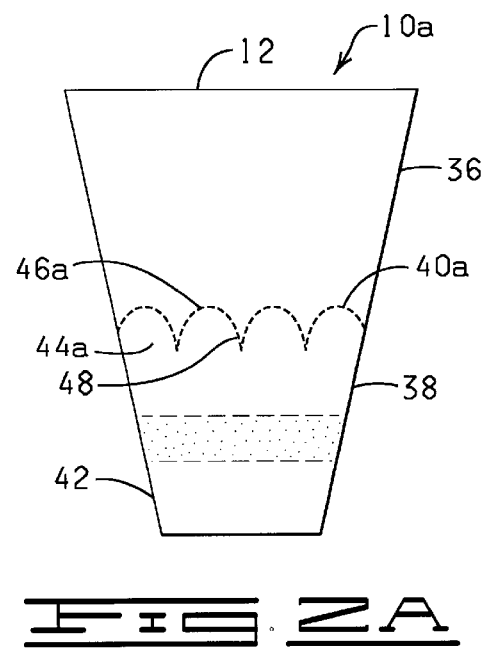
FIG. 2A is an elevational view of a version of a sleeve wherein the perforations have a scalloped pattern.
Figure 2B:
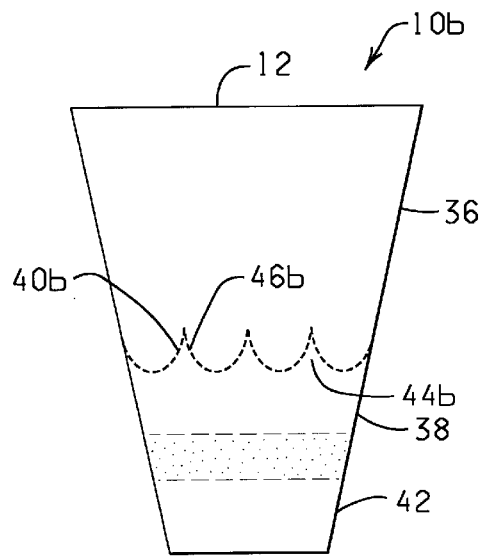
FIG. 2B is an elevational view of a version of a sleeve wherein the perforations have an inverted scalloped pattern.
Figure 2C:
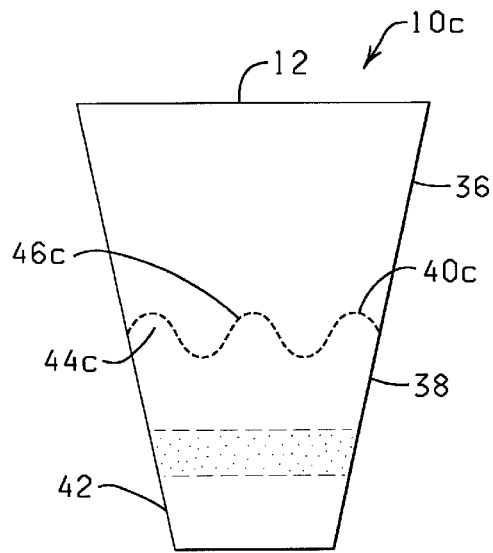
FIG. 2C is an elevational view of a version of a sleeve wherein the perforations have a wave pattern.

In a preferred embodiment, as shown in FIG. 1, the detaching element 40 leaves a straight edge when detached. In any event, once the upper portion 36 is detached, the lower portion 38 comprises a base portion 42 and may leave a skirt portion 44 if the detaching element is not straight. Shown in FIGS. 2A–2F are sleeves 10a–10f which are like sleeve 10 except each has an alternative arrangement of perforations for enabling separation of the upper portion 36 of the sleeve 10a–10f from the lower portion 38 wherein a skirt portion 44a–44f is left extending above the pot. FIG. 2A shows a sleeve 10a having a detaching element 40a comprising perforations having a scalloped pattern. FIG. 2B shows a sleeve 10b which has a detaching element 40b comprising perforations having an upside-down, or inverted, scalloped pattern. FIG. 2C shows a sleeve 10c which has a detaching element 40c comprising perforations having a wavy or sine-wave type pattern. FIG. 2D shows a sleeve 10d which has a detaching element 40d having a toothed or zig-zag perforation pattern.

FIG. 2E shows a sleeve 10e which has a detaching element 40e comprising perforations having a rectangular pattern. Shown in FIG. 2F is a sleeve 10f having a detaching element 40f which comprises perforations having a diagonally-oriented pattern. Each of these sleeves, as for the other sleeves described herein, may have a vertically-oriented line of perforations or other detaching element extending from the upper end 12 of the sleeve 10–10f to the other line of perforations for facilitating removal of the upper portion 36.

The base portion 12 comprises that part of the lower portion 38 which, when the pot 56 is placed into the lower portion 38, has an inner peripheral surface which is substantially adjacent to and surrounds the outer peripheral surface 59 of the pot 56. The skirt portion 44 comprises that part of the lower portion 38 which extends beyond an upper rim 59a of the pot 56 and adjacent at least a portion of the floral grouping 58 contained within the pot 56, generally the lower portion of the floral grouping 58, and which is left to freely extend straight from or at angle, inwardly or outwardly, from the base portion 42 when the upper portion 36 of the sleeve 10 is detached from the lower portion 38 of the sleeve 10 by actuation of the detaching element 40. In the intact sleeve 10, the skirt portion 44, as shown in FIGS 2A–2F, comprises an upper peripheral edge 46a–46f, respectively, generally congruent with the detaching element 40a–40f which is connected to a lower peripheral edge 48 of the upper portion 36 of the sleeve 10a–10f also congruent with the detaching element 40a–40f, respectively. In FIGS. 2A–2F, the upper peripheral edge 46a–46f of the skirt portion 44a–44f is congruent with a series of perforations which together comprise the detaching element 40a–40f, respectively.

As noted above, the upper portion 36 of the sleeve 10 may also have an additional detaching element (not shown) such as a plurality of vertical perforations for facilitating removal of the upper portion 36 and which are disposed more or less vertically therein extending from the detaching element 40 to the upper end 12 of the sleeve 10. When the vertical detaching element is present the upper portion 36 of the sleeve 10 is separable from the lower portion 38 of the sleeve 10 by tearing the upper portion 36 along both the vertical perforations and along the detaching element 40, thereby separating the upper portion 36 from the lower portion 38 of the sleeve 10. The lower portion 38 of the sleeve 10 remains disposed as the base portion 42 about the pot 56 and as the skirt portion 44 about the floral grouping 58 which extends from the pot 56 forming a decorative cover which substantially surrounds and encompasses the pot 56 and at least a portion of the floral grouping 58.

It will be understood that equipment and devices for forming standard floral sleeves are commercially available, and are well known to a person of ordinary skill in the art. A preferred method is discussed below.

As noted above, the sleeve 10 preferably has a closed lower end 14. When the lower end 14 is closed the lower end 14 may have one or more gussets 26 formed therein for allowing expansion of the lower end 14 when an object with a broad lower end such as a pot 56 is disposed therein. In another version of the present invention the lower end 14 may be completely or partially open (as shown in FIG. 8). Where used herein the term "partially open" means that the bottom end of the sleeve 10–10f is partially covered with the sleeve material but has at least one opening therein, for example for allowing drainage.

As noted above, in the preferred version of the present invention, the sleeve 10 comprises an area of bonding material 34 disposed upon a portion at least one of the inner peripheral surfaces 28 and 30 of the base portion 42 of the sleeve 10. The area of bonding material 34, when present, functions to enable portions of at least one of the inner peripheral surfaces 28 and 30, to be bondingly connected to other portions of the inner peripheral surfaces 28 and 30 of the sleeve 10 by crimping therein forming a crimped portion and causing the sleeve 10 to be secured about the pot 56.

The sleeve 10 is generally provided to the operator in a substantially flattened condition and usually as one of a stack of a plurality of sleeves 10. During the process of covering the pot 56, the sleeve 10 is opened, manually or automatically. In the flattened condition of the sleeve 10, the bonding material 34 may partially adhere or cohere to the opposite inner peripheral surface 28 or 30 of the sleeve 10. Obviously, it is desirable to avoid a situation in which the bonding material 34 is permanently or strongly bonded to the opposing inner peripheral surface 28 or 30 of the sleeve 10 because this would make it difficult for the sleeve 10 to be manually or automatically opened for insertion of the pot 56. As a result, the bonding material 34 may be made of an adhesive composition which has a low degree of tackiness such that if the bonding material 34 does adhere to the opposing inner peripheral surface 28 or 30 it can be easily separated from the inner peripheral surface 28 or 30 when the sleeve 10 is opened up. Such adhesives with low tackiness are well known to those of ordinary skill in the art and are commercially available. Further, a release material may be disposed on the bonding material 34 to prevent its adhesion prior to its use.

Alternatively, the bonding material 34 can be composed of a cohesive material. In the version of the invention shown in FIG. 1 the cohesive is applied to only one of the inner peripheral surfaces 28 or 30, the cohesive will not bond to the opposite inner peripheral surface 28 or 30 as long as there is no cohesive material to which it can bond on the opposing inner peripheral surface 28 or 30. In another version of the sleeve 10, shown in FIG. 3, the sleeve 10 has a bonding material 34 disposed on both inner peripheral surfaces 28 and 30. The bonding material 34 may be any bonding material as defined herein and the sleeve 10 may have a release covering or liner disposed on or between the layers of bonding material 34 for inhibiting adhesion or cohesion of the bonding material 34 before usage of the sleeve 10 for covering a pot 56.

Shown in FIG. 4 is a cross-sectional view of sleeve 10 taken through the bonding material 34 wherein the bonding material 34 is disposed in strips on opposing inner peripheral surfaces 28 and 30 of the sleeve 10. The strips of bonding material 34 may extend completely from the first edge 18 of the sleeve 10 to the second edge 20, generally as indicated in FIG. 4 or they may extend only part of the distance from one edge to the other. As indicated above, the bonding material 34 may have release liners thereover for preventing premature adhesion or cohesion thereof, the release liners indicated in FIG. 5 by reference numeral 50. FIG. 6 shows an embodiment wherein the areas of bonding material 34 are staggered across the inner peripheral surfaces 28 and 30 of the sleeve 10 to minimize cohesion or adhesion of the areas of bonding material 34 to opposing surfaces.

In yet another version of the present invention, shown in FIGS. 7–10, a bonding material 52 is disposed on at least a portion of the outer peripheral surface 16 of the lower portion 38 of a sleeve 10i. Similarly to the use of sleeve 10, after the pot 56 is disposed in the inner retaining space 32 of the lower portion 38, the sleeve 10i is manually or automatically crimped about the outer peripheral surface 59 of the pot 56 in the vicinity of the bonding material 52 thereby forming folds in the lower portion 38 which are bondingly connected together by the bonding material 52 to secure the sleeve 10i about the pot 56. The bonding material 52 is preferably disposed on the sleeve 10i so as to be at a position below the upper rim 59a of the pot 56 when the pot 56 is disposed in the lower portion 38 of the sleeve 10a.

The bonding material 52 may be disposed on only one side 22 or 24 of the outer peripheral surface 16 of the sleeve 10i as shown in FIG. 7 or may be disposed on both the first and second sides 22 and 24 of the outer peripheral surface 16 of the sleeve 10i as shown in FIG. 8. FIG. 9 is a cross-sectional view taken through the sleeve 10i of FIG. 8 showing the bonding material 52 on both the first and second sides 22 and 24 of the outer peripheral surface 16 of the sleeve 10*i* and extending substantially from the first edge 18 to the second edge 20, although it will be appreciated that the bonding material 52 may extend only part of the distance from the first edge 18 to the second edge 20.

As noted above for sleeve 10, the bonding material 52 on sleeve 10*i* may have a release material 54 disposed thereon such as is shown for example in FIG. 10.

In an alternate version of the sleeve 10–10*i*, disposed upon the upper end portion of the second inner peripheral surface 30 of side 24 is a closure bonding material (not shown). After a pot 56 is disposed within the sleeve 10–10*i*, the upper end portion of side 24 with the closure bonding material disposed thereon can be folded onto an upper end portion of side 22 thereby sealing the upper portion 36 of the sleeve 10–10*i*.

In another version of the invention there is a second closure bonding material (not shown) which is disposed upon an upper end portion of side 22. When the upper end portion of side 24 having the first closure bonding material is folded over onto side 22, the first closure bonding material bondingly engages the second closure bonding material thereby effecting a seal in the upper end 12 of the sleeve 10. Preferably, in this version, the first and second closure bonding materials are both cohesive materials so that when another, sleeve is pressed against the sleeve, neither bonding material will cause the adjacent sleeves to be connected to each other thereby facilitating the separation of sleeves 10*i* from the stack.

It will be readily appreciated by those of ordinary skill in the art that processes for making standard floral sleeves which have open upper and lower ends are well known. In the preferred embodiments of the present invention, the sleeve 10–10*i* is constructed with a closed bottom which may simply comprise a seal along the lower end 14 of the sleeve 10–10*i* or more preferably the closed bottom comprises an infolded portion such as a gusset 26 which when opened enables expansion of the bottom of the sleeve 10–10*i* for allowing insertion of the pot 56 therein.

One version of the apparatus and process used to construct a sleeve as described herein is shown in FIGS. 39–44 and accompanying descriptions in U.S. Pat. No. 5,493,809, the specification of which is hereby incorporated herein by reference in its entirety.

During operation, when the sleeve 10–10*i* is opened in anticipation of disposing the pot 56 within the inner retaining space 32 thereof, after opening, the release material 50 or 54, respectively, if present, can be removed from the space corresponding bonding material 34 or 52 of the sleeve 10–10*i* prior to insertion of the pot 56 therein.

Shown in FIGS. 11A and 11B are sleeves 10 and 10*i*, respectively, after the pot 56 having the floral grouping 58 is disposed therein. FIG. 11A shows the pot 56 disposed adjacent and facing the bonding material 34 of the sleeve 10 and FIG. 11B shows the pot 56 disposed within the sleeve 10*i* with the bonding material 52 adjacent, yet opposite the outer peripheral surface 59 of the pot 56. In the preferred embodiment of the present invention, the bonding material 34 is a bonding material such as a cohesive which bonds only to surfaces also having said cohesive. Therefore, the bonding material 34 is not intended to bondingly connect to the outer peripheral surface 59 of the pot 56. Rather, it is intended that the sleeve 10 be secured about the pot 56 without bondingly connecting to the pot 56 itself. For example, the sleeve 10–10*i* may be secured to the pot 56 by the forming of a crimped area 60 in the lower portion 38 of the sleeve 10–10*i* as shown in FIG. 12. The crimped area 60 is formed by forming folds 62 in that portion of the sleeve 10–10*i* having the bonding material 34 or 52. Preferably the lower portion 38 of the sleeve 10–10*i* is at least slightly larger than the pot 56 so that the folds 62 can be formed in the sleeve 10–10*i* to secure the sleeve about the pot 56. At least some of the folds 62 have overlapping portions which are connected by the bonding material 34 or 52 as explained in more detail below.

Embodiments of FIGS. 13–24

Shown in FIGS. 13–24 are several examples of how folds can be formed in the lower portion 38 of the sleeve 10–10*i* for securing the sleeve 10–10*i* about the pot 56 without bondingly connecting the sleeve 10–10*i* to the pot 56 itself.

Figure 13:
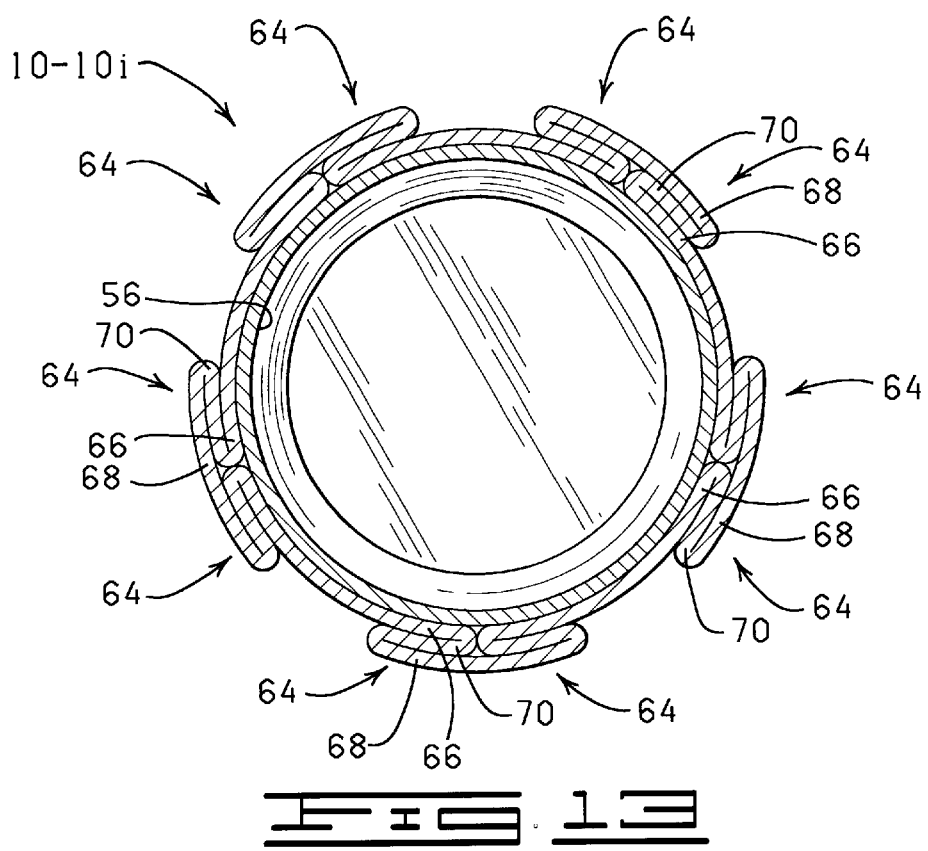
FIG. 13 is a cross-sectional view of a sleeve crimped about a pot.

FIG. 13 shows a sleeve 10–10*i* having a plurality of folds in which some portions of the folds are connected by a bonding material 34 on the inner peripheral surfaces 28 and/or 30 of the sleeve (sleeve 10) or by a bonding material 52 on the outer peripheral surface 16 of the sleeve (sleeve 10*i*). FIG. 13 shows a plurality of z-shaped overlapping folds 64 connected by the bonding material (not shown).

Each z-shaped overlapping fold 64 shown in FIG. 13 has an inner portion 66, an outer portion 68 and a middle portion 70 which is sandwiched between the inner and outer portions 66 and 68.

Figure 14:
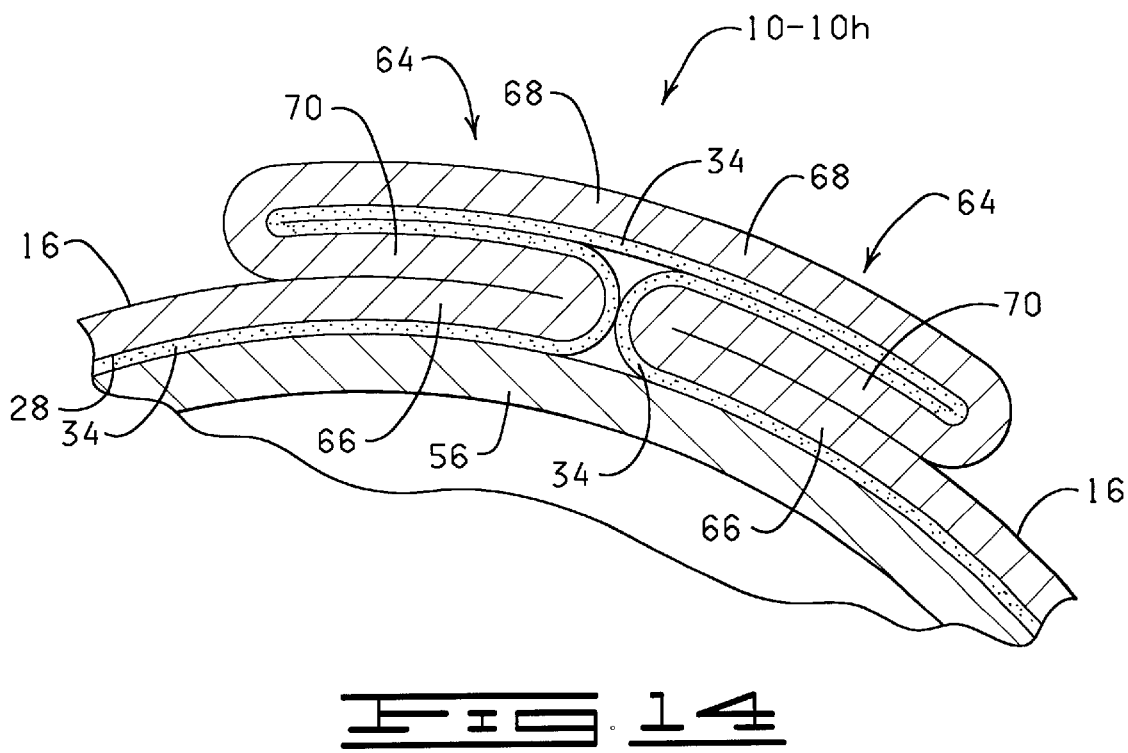
FIG. 14 is an enlarged, fragmental cross-sectional view of one of the crimped folds shown in FIG. 13 where bonding material is disposed on an inner surface of the sleeve such as with the sleeve in FIG. 3.

FIG. 14 shows an enlargement of a z-shaped overlapping fold 64 which shows the position of the bonding material 34 disposed on the first and/or second inner peripheral surfaces 28 and 30 of the sleeve 10–10*h* in relation to the overlapping portions of the sleeve 10–10*h*. The inner portion 66 is not bonded to the middle portion 70 since there is no bonding material disposed on the outer peripheral surface 16 of the sleeve 10–10*h* in this embodiment. The first inner peripheral surface 28 of the middle portion 70 faces and is bonded to the first inner peripheral surface 28 of the outer portion 68 of the sleeve 10–10*h* via the bonding material 34 which is disposed on the first and/or second inner peripheral surfaces 28 and 30 of sleeve 10–10*h*. A similar pattern is repeated for each corresponding z-shaped fold 64 and for each other z-shaped fold 64 in the sleeve 10–10*h*.

Figure 15:
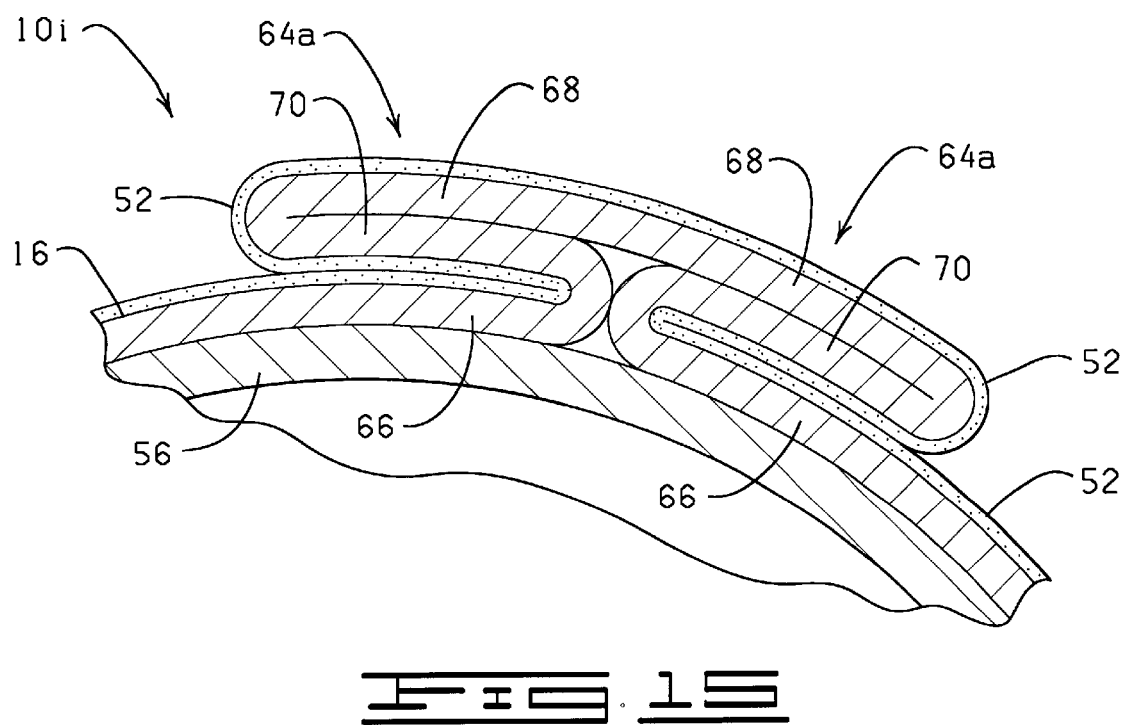
FIG. 15 is an enlarged, fragmental cross-sectional view of one of the crimped folds shown in FIG. 13 where bonding material is disposed on an outer surface of the sleeve such as with the sleeve in FIG. 8.

FIG. 15 shows an enlargement of a z-shaped overlapping fold 64*a* similar to that of FIG. 14 except that FIG. 15 represents a fold 64*a* formed in sleeve 10*i* having a bonding material 52 disposed on the outer peripheral surface 16 of the sleeve 10*i*. Fold 64*a* has an inner portion 66, an outer portion 68 and a middle portion 70 sandwiched between portions 66 and 68. Portion 70 is connected to portion 66 via the bonding material 52. Portion 68 is not connected to portion 70 because there is no bonding material interposed between the two portions.

Figure 16:
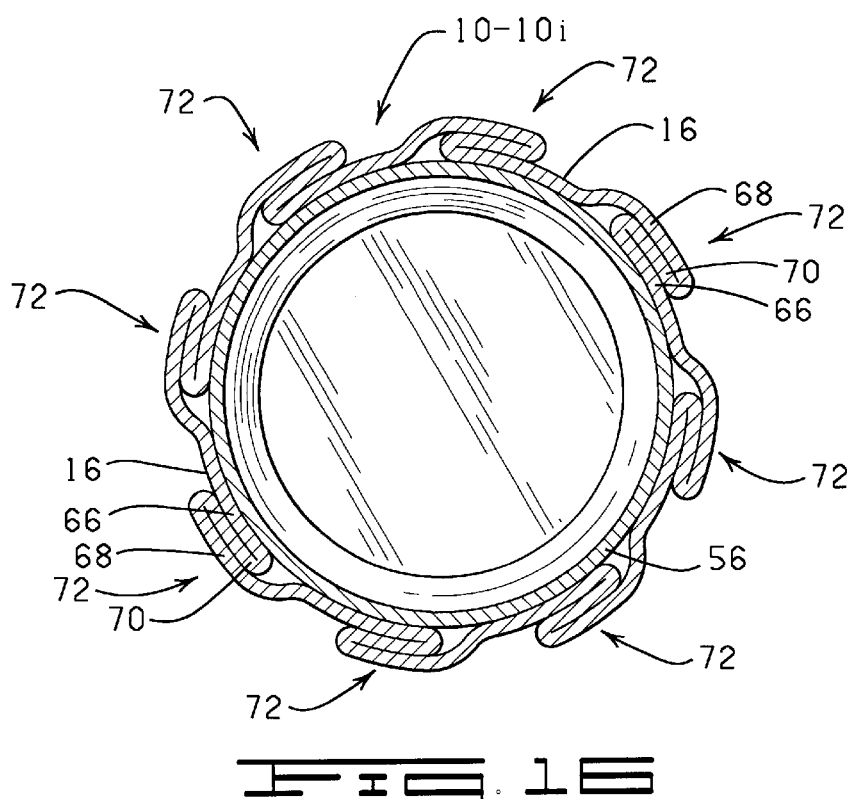
FIG. 16 is a cross-sectional view of a sleeve crimped about a pot in an alternate style.

FIG. 16 shows yet another manner in which the sleeve 10–10*i* may be secured about the pot 56. In this version there are a plurality of folds 72 which are similar to the z-shaped folds 64 shown in FIGS. 13–15 except that the folds 64 shown in FIGS. 13–15 are positioned as pairs of "mirror image" folds 64 while in FIG. 16 each z-shaped fold 72 occurs, singly and not as one of a distinct pair of adjacent folds 64.

Each fold 72 has an inner portion 66, and outer portion 68 and a middle portion 70 sandwiched between portions 66 and 68. The outer peripheral surface 16 of the inner portion 66 faces the outer peripheral surface 16 of a middle portion 70.

Figure 17:
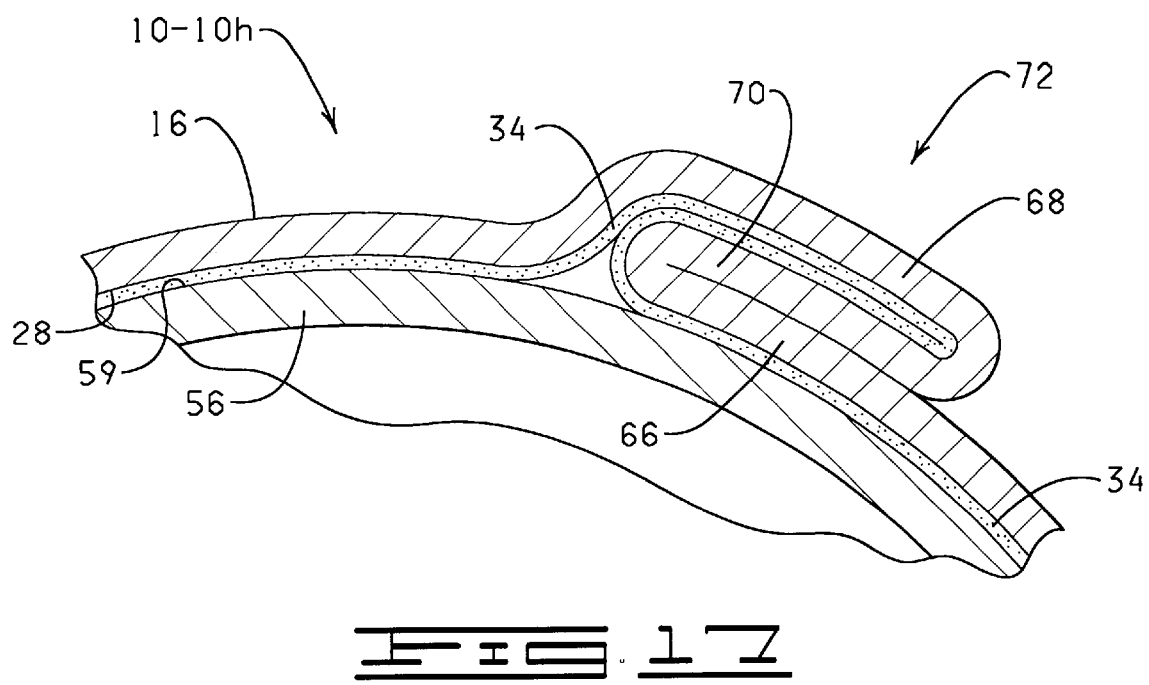
FIG. 17 is an enlarged, fragmental cross-sectional view of one of the crimped folds shown in FIG. 16 where bonding material is disposed on an inner surface of the sleeve such as with the sleeve in FIG. 3.

FIG. 17 shows such a fold 72 formed in a sleeve such as sleeve 10–10*h* wherein the bonding material 34 is disposed on the first inner peripheral surface 28 of the sleeve 10–10*h*.

Figure 18:
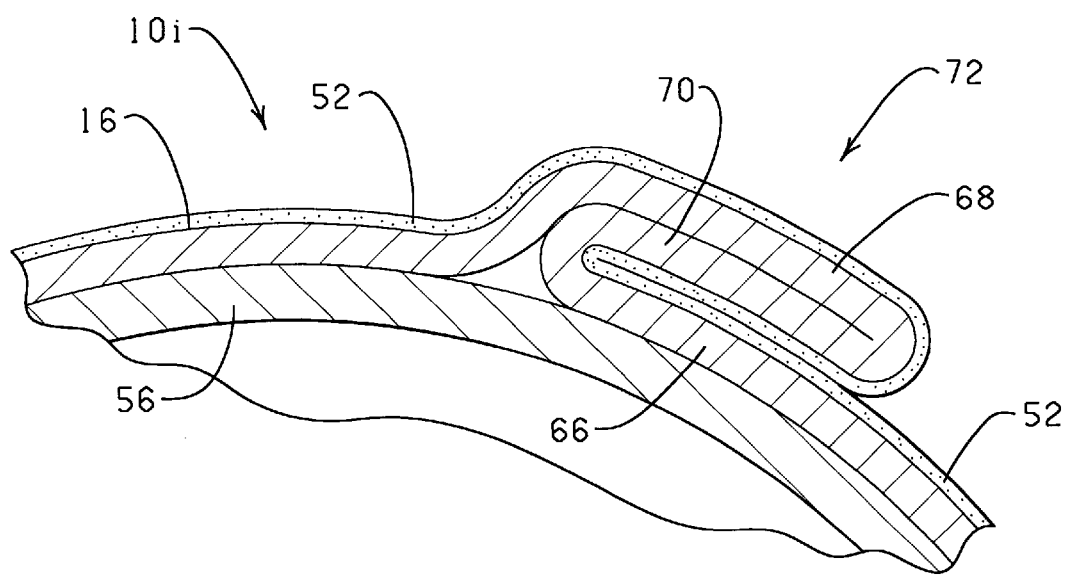
FIG. 18 is an enlarged, fragmental cross-sectional view of one of the crimped folds shown in FIG. 16 where bonding material is disposed on the outer surface. of the sleeve such as with the sleeve in FIG. 8.

The bonding material 34 is shown disposed on the first inner peripheral surface 28, for example only, and may also be disposed on the second inner peripheral surface 30 or both the first and second inner peripheral surfaces 28 and 30. Bonding material 34 touches the outer peripheral surface 59 of the pot 56 but does not connect to it because the bonding material 34 is preferably a cohesive bonding material rather than an adhesive material. In such an embodiment, the first inner peripheral surface 28 of the outer portion 68 is bondingly connected via bonding material 34 to the first inner peripheral surface 28 of the middle portion 70, while inner and middle portions 66 and 70 are not bondingly connected. FIG. 18 shows a fold 72 formed in sleeve 10i having the bonding material 52. The outer peripheral.surface 16 of the inner portion 66 is bondingly connected via bonding material 52 to the outer peripheral surface 16 of the middle portion 70. The outer portion 68 is not bondingly connected to the middle portion 70.

FIGS. 19 and 20 show another embodiment of the sleeve 10–10h crimped about a pot 56 comprising a plurality of vertically-oriented folds 74 in which portions 76 of the sleeve 10–10h are pinched together forming a U-shaped fold 74, extending outwardly from the pot 56 and wherein the inner peripheral surfaces of the portions 76 of the folds 74 in sleeve 10–10h which face each other are bondingly engaged to each other by the bonding material 34 disposed on the inner surface 28 and/or 30 of the sleeve 10–10h. A similar bonding pattern is repeated for each U-shaped fold 74 in the sleeve 10–10h.

FIGS. 21 and 22 show another embodiment of the sleeve 10–10h crimped about a pot 56 comprising one or more horizontally-oriented folds 78 in which portions 80 of the sleeve 10–10h are pinched together forming a U-shaped fold 78 extending outwardly and extending about at least part of the circumference of the pot 56. The inner peripheral surfaces 28 and/or 30 of the portions 80 of the fold 78 which face each other are bondingly connected via the bonding material 34 disposed on the inner surface of sleeve 10–10h. The fold 78 in FIG. 22 in an enlargement of the fold 78 in FIG. 21 for explicitly showing the connection mode via the bonding material 34.

FIGS. 23 and 24 show another embodiment of the sleeve 10i crimped about a pot 56 comprising one or more horizontally-oriented folds 82. in which portions 84 of the sleeve 10i are pinched together forming an inverted U-shaped fold 82 wherein the tip 86 of the U-shaped fold 82 extends inwardly toward the outer peripheral surface 59 of the pot 56 thereby forming an inwardly-oriented ridge 88. The outer peripheral surfaces 16 of the portions 84 of the fold 82 which face each other are bondingly connected via the bonding material 52 disposed oh the outer peripheral surface 16 of the sleeve 10i. The fold 82 in FIG. 24 is an enlargement of the fold 82 in FIG. 23 for explicitly showing the connection made via the bonding material 52.

It will be understood by one of ordinary skill in the art that when the sleeve 10–10i is crimped about the outer peripheral surface 59 of the pot 56 that a combination of the types of folds shown in FIGS. 14, 17, 20 and 22, or other folds not shown herein, may be formed in the sleeve 10–10i, for example, the pinch folds 74 of FIG. 20 may alternate with the z-shaped folds 64 or 72 of either or both of FIGS. 14 and 17. It will be further understood that when the sleeve 10i is crimped about the pot 56 that a combination of the types of folds shown in FIGS. 15, 18 and 24 may be formed in the sleeve 10i. Also, the sleeve 10–10i may be crimped about the pot 56 in other ways which form folds having configurations not shown herein. Moreover, in another embodiment a sleeve (not shown) may have a bonding material both on the inner peripheral surface and outer peripheral surface thereof and thus may have any or all of the folds mentioned herein simultaneously.

Changes may be made in the construction and the operation of the various components, elements and assemblies described herein or in the steps or the sequence of steps of the methods described herein without departing from the spirit and scope of the invention as defined in the following claims.

What is claimed is:

1. A method of packaging a pot, comprising:
providing a flexible sleeve, the flexible sleeve having a lower end, an upper end, a skirt portion, an outer peripheral surface, and an inner peripheral surface surrounding an inner retaining space and an adhesive or cohesive bonding material disposed upon a portion of the flexible sleeve;
disposing a pot having an upper rim into the inner retaining space of the flexible sleeve; and
forming overlapping connected folds in the portion of the flexible sleeve having the bonding material thereby forming a crimped area in the flexible sleeve and wherein the flexible sleeve is positioned about the pot such that at least a portion of the skirt portion extends above the upper rim of the pot.

2. The method of claim 1 wherein in the step of providing the flexible sleeve, the flexible sleeve initially comprises a flattened body.

3. The method of claim 1 wherein in the step of providing the flexible sleeve, the flexible sleeve further comprises a release material disposed on the bonding material which is removed from the flexible sleeve prior to forming a crimped area in the flexible sleeve.

4. The method of claim 1 wherein in the step of providing the flexible sleeve the bonding material is a cohesive material disposed on the inner peripheral surface of the flexible sleeve.

5. The method of claim 1 wherein in the step of providing the flexible sleeve the bonding material is disposed on the outer peripheral surface of the flexible sleeve.

6. The method of claim 1 wherein in the step of providing the flexible sleeve, the flexible sleeve has a cylindrical shape.

7. The method of claim 1 wherein in the step of providing the flexible sleeve, the flexible sleeve has a frustoconical shape.

8. The method of claim 1 wherein in the step of providing the flexible sleeve the flexible sleeve is at least slightly larger than the size of the pot to be disposed therein.

9. The method of claim 1 wherein in the step of providing the flexible sleeve, the lower end of the flexible sleeve is sealed.

10. A method of packaging a pot, comprising:
providing a flexible sleeve, the flexible sleeve having a lower end having a gusset, an upper end, a skirt portion, an outer peripheral surface, and an inner peripheral surface surrounding an inner retaining space and an adhesive or cohesive bonding material disposed upon a portion of the flexible sleeve;
disposing a pot having an upper rim into the inner retaining space of the flexible sleeve; and
forming overlapping connected folds in the portion of the flexible sleeve having the bonding material thereby forming a crimped area in the flexible sleeve and wherein the flexible sleeve is positioned about the pot such that at least a portion of the skirt portion extends above the upper rim of the pot.

11. The method of claim 10 wherein in the step of providing the flexible sleeve, the flexible sleeve initially comprises a flattened body.

12. The method of claim 10 wherein in the step of providing the flexible sleeve, the flexible sleeve further comprises a release material disposed on the bonding material which is removed from the sleeve prior to forming a crimped area in the flexible sleeve.

13. The method of claim 10 wherein in the step of providing the flexible sleeve the bonding material is disposed on the inner peripheral surface of the flexible sleeve.

14. The method of claim 10 wherein in the step of providing the flexible sleeve the bonding material is disposed on the outer peripheral surface of the flexible sleeve.

15. The method of claim 10 wherein in the step of providing the flexible sleeve the flexible sleeve has a cylindrical shape.

16. The method of claim 10 wherein in the step of providing the flexible sleeve the flexible sleeve has a frustoconical shape.

17. The method of claim 10 wherein in the step of providing the flexible sleeve the flexible sleeve is at least slightly larger than the size of the pot to be disposed therein.

18. The method of claim 10 wherein in the step of providing the flexible sleeve, the lower end of the flexible sleeve is sealed.

* * * * *

UNITED STATES PATENT AND TRADEMARK OFFICE
CERTIFICATE OF CORRECTION

PATENT NO. : 6,393,801 B1  Page 1 of 1
APPLICATION NO. : 09/717785
DATED : May 28, 2002
INVENTOR(S) : Weder et al.

It is certified that error appears in the above-identified patent and that said Letters Patent is hereby corrected as shown below:

Item [56]
Page 2: Under Foreign Patent Documents: Delete "GB 0256410" and replace with the number --GB 2056410--.

Column 13, Line 51: After the word "disposed" delete the word "oh" and replace with the word --on--.

Signed and Sealed this

First Day of August, 2006

JON W. DUDAS
*Director of the United States Patent and Trademark Office*